United States Patent [19]
Kuga

[11] Patent Number: 5,463,479
[45] Date of Patent: Oct. 31, 1995

[54] IMAGE FORMING APPARATUS

[75] Inventor: Masato Kuga, Kanagawa, Japan

[73] Assignee: Kabushiki Kaisha Toshiba, Kawasaki, Japan

[21] Appl. No.: 430,124

[22] Filed: Apr. 25, 1995

Related U.S. Application Data

[63] Continuation of Ser. No. 911,154, Jul. 9, 1992.

[30] Foreign Application Priority Data

Jul. 24, 1991 [JP] Japan ..................... 3-184563

[51] Int. Cl.$^6$ .................................. H04N 1/46
[52] U.S. Cl. ............................ 358/518; 358/523
[58] Field of Search ..................... 358/500, 505, 358/515, 518–523

[56] References Cited

U.S. PATENT DOCUMENTS

| | | | |
|---|---|---|---|
| 4,891,692 | 1/1990 | Outa | 358/75 |
| 4,929,978 | 5/1990 | Kanamori et al. | 358/77 |
| 4,931,864 | 6/1990 | Kawamura | 358/75 |
| 5,014,123 | 5/1991 | Imoto | 358/75 |
| 5,289,270 | 2/1994 | Hayashi | 358/312 |

Primary Examiner—Bernard Roskoski
Attorney, Agent, or Firm—Limbach & Limbach

[57] ABSTRACT

An image forming apparatus includes an image reading unit for reading a color image of original document and an image forming unit for forming a color reproduced image on an image forming medium based on the color image read by the image reading unit. In the image forming apparatus, the image reading unit firstly reads a first original document, which is regarded as a standard, to obtain a first color image. The first color image is converted into a plurality of first separate color signals corresponding to each of the color components of the first color image. The image reading unit also reads a second original document to obtain a second color image. The second color image is converted into a plurality of second separate color signals corresponding to each of the color components of the second color image. This image forming apparatus has a parameter calculation unit and a density conversion unit. The parameter calculation unit calculates density conversion parameters based on each of the first separate color signals and the density conversion unit converts each of the second color signals based on the density conversion parameters calculated by the parameter calculation unit into optimum color signals such that the reproduced image is formed on the image forming medium by the image forming unit with optimum density.

3 Claims, 4 Drawing Sheets

IMAGE FORMING APPARATUS

This is a continuation of co-pending application Ser. No. 07/911,154 filed on Jul. 9, 1992.

BACKGROUND OF THE INVENTION

1. Field of the Invention

The present invention relates to an image forming apparatus in which it is possible to always form an image optimally.

2. Description of the Related Art

In conventional image forming apparatus such as color copying machines, light from an exposure lamp irradiates onto the original document. The reflected light from the original document pass through a RGB filter to obtain color signals each corresponding to color components. Then the color signals are treated to finally form a color image on a paper.

In image forming process such as this, there are various correction processes in the latter part of the image density conversion, when a standard paper, which is used as a paper having a white color, is placed on the original document table, it is assumed that the image signal is optimized at 1.

Consequently, at the point in time when the standard paper is placed on the original document table, when there are large differences in brightness and color from a shading correction standard plate mounted on the original document table, the assumption of the image signal being at 1 is void.

Furthermore, as this type of image treatment continues as it is, the above-mentioned assumption of the brightness of the image is inaccurate and as the various correction treatments are undertaken in practice, in extreme case there are fluctuations in the color matching such that the quality of the image is noticeably deteriorated.

To overcome the above-mentioned problem, in a color image reading apparatus shown in U.S. Pat. No. 4,891,692 (Jan. 2, 1990), a CPU refers the reading image signal value, then the CPU calculates optimal density conversion parameters based upon this reference value to correct the image density conversion parameters. After that, the process of image density conversion is performed.

In the above-mentioned case, if the apparatus have fluctuations of characteristics of the exposure lamp, fluctuations of precision of the construction, and etc., the brightness of the image is not converted uniformly within every pixel of each of the R, G, B colors signals in many cases.

In this way when the ratio of the sensitivity of each R, G, B color signal is thus distorted, in prior art correction processes, the problem of the image quality fluctuations between each apparatus can not be solved.

SUMMARY OF THE INVENTION

It is an object of the present invention to provide an image forming apparatus in which the reading fluctuation, in particular the distortion of the ratio of the sensitivity of each of the various color signals, can be automatically corrected, thus enabling optimal image forming to be performed.

According to the present invention there is provided an image forming apparatus including means for reading a color image of original document and means for forming a color reproduced image on an image forming medium based on the color image read by the reading means, the apparatus comprising first conversion means for converting a first color image of a first original document, which is regarded as a standard, read by the reading means into a plurality of first separate color signals corresponding to each of the color components of the first color image; means for calculating density conversion parameters based on each of the first separate color signals obtained by the first conversion means; second conversion means for converting a second color image of a second original document read by the reading means into a plurality of second separate color signals corresponding to each of the color components of the second color image; and third conversion means for converting each of the second separate color signals obtained by the second conversion means based on the density conversion parameters calculated by the calculating means into optimum color signals such that the reproduced image is formed on the image forming medium by the image forming means with optimum density.

DETAILED DESCRIPTION OF THE PREFERRED EMBODIMENT

Referring to the accompanying drawings, a detailed description will subsequently be given of the preferred embodiment of the present invention.

Figure 1:
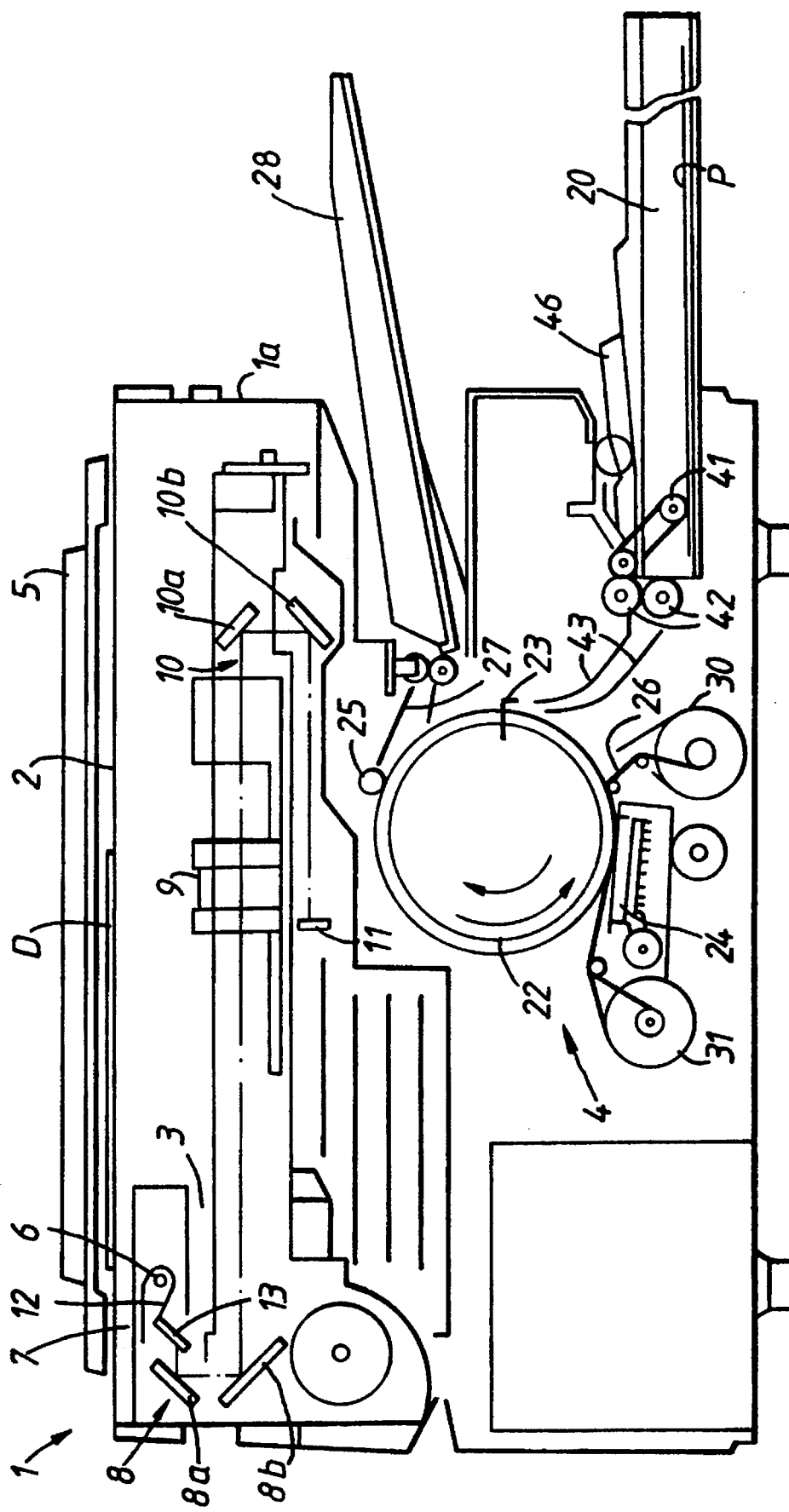
FIG. 1 is a sectional view showing an image forming apparatus of the present invention.

FIG. 1 shows a thermal transfer type color copier 1 as an example of an image forming apparatus of the present invention. On the upper front part of main body 1a, an operation panel (not shown) is provided. The upper part of main body 1a is composed of image reading unit 3 which scans and reads original document D, set on original document table 2 (transparent glass), and below this is image forming unit 4. On the original document table 2, document cover 5 is provided so that it is free to open and close. Original document table 2 is secured to main body 1a.

Image reading unit 3 comprises first carriage 7 on which lamp 6 as a light source is mounted, second carriage 8 which bends the light path by mirrors 8a and 8b, lens 9, and mirror unit 10, which conducts the light reflected from original document D to photoelectric converter 11 and carries out correction of the light path length when the magnification is changed. The photoelectric converter 11 receives the light reflected from original document D, and a drive system (not shown) alters the positions of these various components.

On first carriage 7 are mounted lamp 6, which irradiates light onto original documentD, reflector 12 as a reflecting mirror, which converges the light from lamp 6 onto the surface of the original document, and mirror 13, which guides the light reflected from original document D towards second carriage 8.

On second carriage 8 are mounted mirror 8a and 8b, which guide the light conducted by mirror 13 to lens 9. First and second carriages 7 and 8 are connected by a timing belt (not shown), and the design is such that second carriage 8 travels in the same direction as, but as ½ the speed of, first carriage 7. By this means, scanning can be carried out while maintaining the length of the light path to lens 9 constant.

Lens 9 has a fixed focal length, and is designed to shift in the direction of the light axis when the magnification is changed. Lens 9 also may be constructed as a lens in which the focal length is variable, such as a zoom lens.

Mirror unit 10 comprises a pair of mirrors 10a and 10b, and the positions of these mirrors 10a and 10b are changed to conform to variations in the light path length corresponding to the magnifications selected. Mirrors 10a and 10b conduct that light to photoelectric converter 11 by bending the light path of the light from lens 9.

The light reflected from the surface of original document D forms an image on photoelectric converter 11. Photoelectric converter 11 is, for instance, composed of a CCD type line image sensor. Photoelectric converter 11 outputs separately the color signals of C (cyanogen), G (green) and Y (yellow), or R (red), G (Green) and B (blue) light corresponding to each of the color components of the image of the original document D by photoelectric conversion of the reflected light from the original document D. In this case, one pixel of the original document D corresponds to the consecutive three elements (C, G and Y, or R, G and B) of CCD sensor. The output of photoelectric converter 11 is input to A/D converter 52 mentioned below.

First and second carriages 7 and 8, lens 9 and mirrors 10a and 10b are each moved by stepping motors (not shown). Mirrors 10a and 10b and lens 9 are each moved individually by the stepping motor (not shown).

In image forming unit 4, platen drum 22 is arranged in a position in approximately the center part of image forming unit 4. Platen drum 22 has a periphery composed of an elastic body, such as rubber, and has the function of being the platen roller for thermal head 24. Platen drum 22 is rotated in both clockwise and anticlockwise directions by a platen motor (not shown). When platen drum 22 is rotated in the anticlockwise direction, paper P is wound on the periphery of platen drum 22 so that paper P will not shift when superposition printing is carried out. Pressure roller 25 is arranged on the periphery of platen drum 22 to stop paper P from floating away from platen drum 22. The length of the circumference of platen drum 22 is a little longer than the length in the length direction of the largest paper size.

Thermal head 24 is arranged beneath platen drum 22. Ink ribbon 26 is fed and positioned between platen drum 22 and thermal head 24 such that ink ribbon 26 is in contact with thermal head 24 on platen drum 22 side. One end of ink ribbon 26 is wound on take-up side spool 30, and the other end of ink ribbon 26 is wound on dispense side spool 31. Ink ribbon 26, take-up side spool 30 and dispense side spool 31 are contained in an ink ribbon container (not shown), enabling the size to be changed for each size of A4 and B5 size.

Paper supply roller 41 is provided in the lower right-hand part of main body 1a. Paper supply roller 41 dispense paper P, which is stored in paper cassette 20, sheet by sheet. Paper dispensed by paper supply roller 41 is conveyed towards platen drum 22 via guide 43 by feeding roller 42, and is wrapped around platen drum 22 by gripper 23 and presser rollers 25. By this means it is possible to convey the paper accurately. In this case, paper cassette 20 is free to be installed in or removed from the side of main body 1a. Manual paper feed unit 46 is provided on paper cassette 20 for supplying paper P manually. The design is that paper P supplied from manual paper feed unit 46 is also wrapped around platen drum 22 in the same way as above.

Paper P, whose leading edge is secured by gripper 23, is wrapped onto platen drum 22 by its rotation in the anticlockwise direction. After the leading edge of paper P has passed the printing area, thermal head 24 is pressed against platen drum 22 and printing is executed.

When the printing of the first color has been completed, platen drum 22 will have completed approximately one revolution. At this point, thermal head 24 is temporarily released, and the start of the next color is brought into position by taking-up on take-up side spool 30. Then platen drum 22 once again begins to rotate in the anticlockwise direction, printing is executed by thermal head 24, and the next color is printed by superposing.

In this way, in the case of full-color copying, image forming is carried out in the four operations of yellow, magenta, cyan and black, or the three operations of yellow, magenta and cyan. In the case of single colors such as black, it is carried out in one operation.

When discharging paper P from main body 1a, platen drum 22 rotates in the anticlockwise direction until the trailing edge of paper P arrives at paper dispense guide 27. When the trailing edge of paper P has arrived at paper dispense guide 27, platen drum 22 rotates in the clockwise direction, and the trailing edge of paper P is separated from platen drum 22 by a separator claw (not shown), and guided to paper discharge guide 27. Then, finally, the leading edge of paper P is released from gripper 23, and paper P on which a copy has been executed is transported by paper dispense guide 27 and is discharged onto receiving tray 28.

Figure 2:
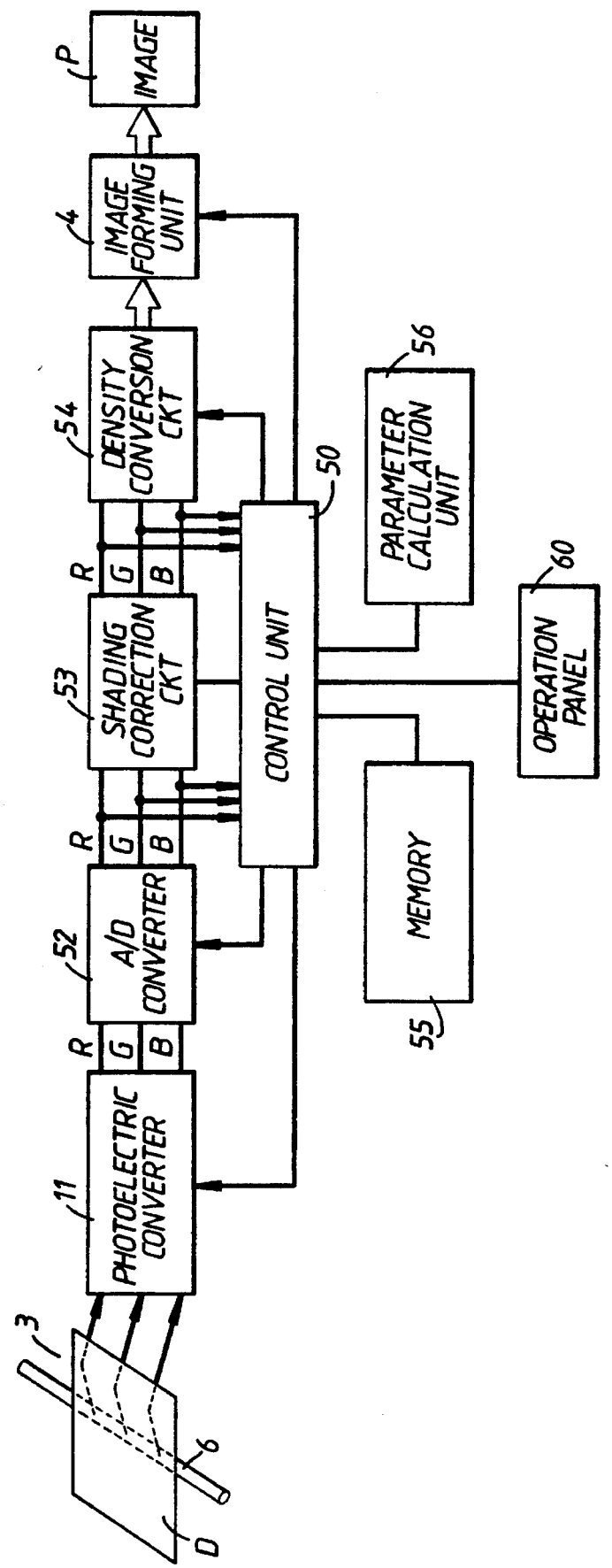
FIG. 2 is a block diagram showing a control system of the image forming apparatus shown in FIG. 1.

A control system of copier 1 will now be described with reference to FIG. 2.

Copier 1 includes control unit 50, A/D converter shading correction circuit 53 and density conversion circuit 54. Control unit 50 acts to control the whole apparatus. A/D converter 52 converts in each of the R, G, B color analogue signals of the signal output from photoelectric converter 11 into color digital signals. Shading correction circuit 53 performs a shading correction in each of the R, G, B color digital signals of the signal output from A/D converter 52. Density conversion circuit 54 performs the density conversion in each of the R, G, B digital signals of the signal output from shading correction circuit 53.

Control unit 50 operates and controls each of photoelectric converter 11, A/D converter 52, shading correction circuit 53, and density conversion circuit 54 together with controlling image forming unit 4.

The output signal from A/D converter 52 for each of the R, G, B color digital signals are input to control unit 50 and the output signal from shading correction circuit 53 for each of the R, G, B color digital signals are also input to control unit 50.

Memory 55, parameter calculation unit 56 and operation panel 60 are connected to control unit 50. The output for each of the R, G, B color digital signals from A/D convertor 52 and shading correction circuit 53 are stored in memory 55. Parameter calculation unit 56 calculates density conversion parameters to convert each of the R, G, B signals of the image signal from the original document D to be made equal to a standard value based on each of the R, G, B signals stored in the memory 55. The input of each of the various operation signals is performed by operation panel 60.

Figure 3:
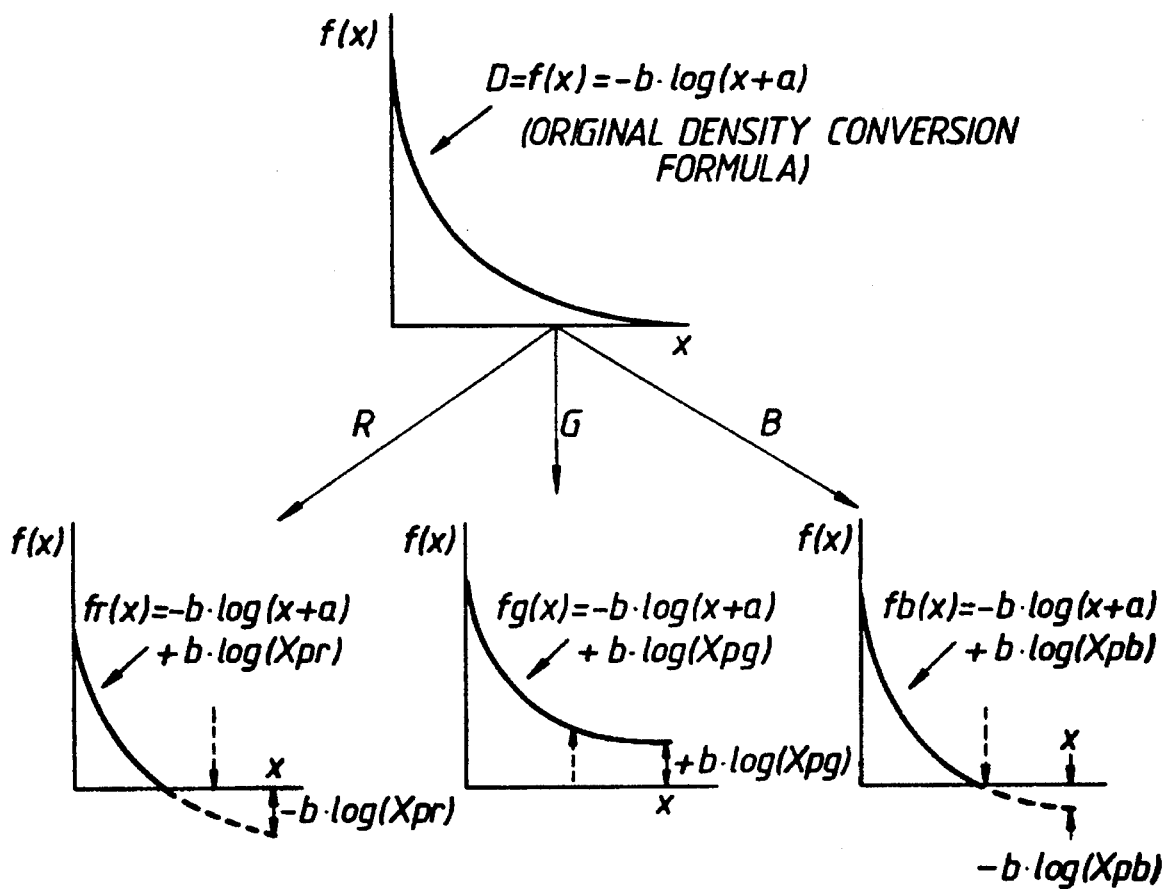
FIG. 3 is a explanatory diagram showing the circumstances of the density conversion of each of the R, G, B color signals.
Figure 4:
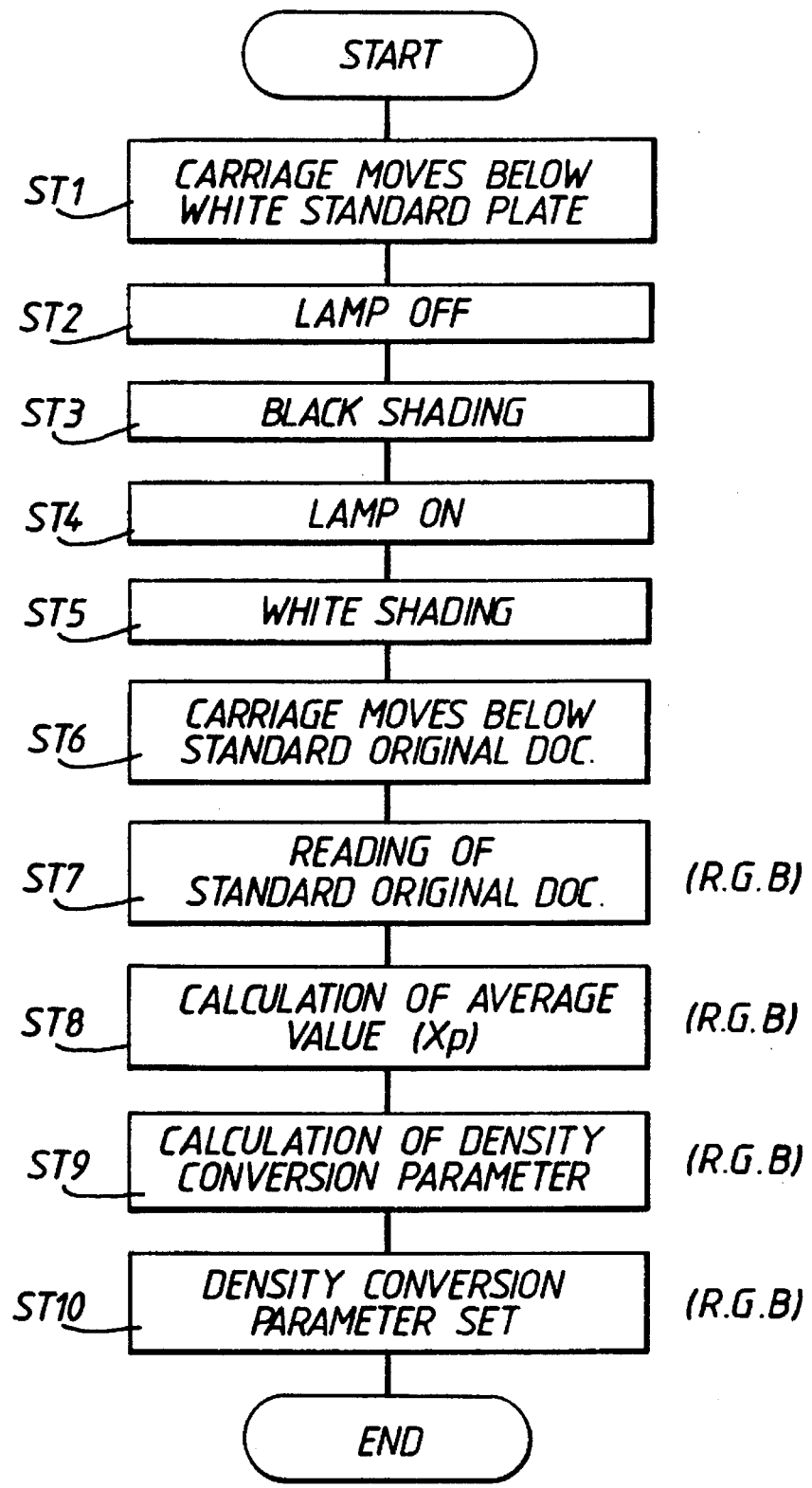
FIG. 4 is a flowchart showing the correction operation of the image forming apparatus of the present invention.

The operation of the above-mentioned copier 1, principally the image density correction process, will now be described with reference to FIGS. 3 and 4.

In order to correct the distortion of the ratio of the sensitivity of each of the R, G, B color signals abovementioned, firstly, at the point in time of the density conversion process, it is necessary to standardise the color signal of the multicolors of the standardising original document to 1.

In this case, output from the standardising original document after shading correction, as the above-mentioned fluctuation is not 1, it becomes Xpr= Wpr/Wor, Xpg= Wpg/Wog, Xpb= Wpb/Wob. Where Wp is reading signal value of the standardising original document, Wo is the reading signal value of the shading standard plate. And the suffixes r, g, and b indicate R, G and B.

When each of the color signals of the standardising original document is input at the time of the shading correction is 1, each image signal in each of the R, G, B components may be multiplied by 1/Xpr, 1/Xpg, 1/Xpb.

However, the problems is that in the construction of actual hardware, every color signal is divided by Xp.

Therefore, the standardising original document is read (obtained by the shading corrected signal), the result of this is used to correct the formula with reference to the original density conversion formula and when the color signal of the standardising original document is input, the brightness can be taken as of equivalent function to 1.

As a tangible means to overcome this, firstly the standardizing original document is read, this input image signal (standard signal: Xpr, Xpg and Xpb) is stored in memory 55, when the density conversion process is usually performed the input image signal is divided by Xpr, Xpg and Xpb, respectively. Through the abovementioned, in practice there is a problem each time the value of the input image signal is divided by Xpr, Xpg, Xpb, by the previous the density conversion parameters the value of the input image signal being divided by Xpr, Xpg and Xpb becomes equivalent to each of the R, G, B color signals which are individually corrected, thus the density conversion process should be performed appropriately.

The following provides further details.

Firstly, first carriage 7 is moved below a white standard plate which is mounted to original document table 2 (ST1), illumination lamp 6 is in the switched off state (ST2), the black shading (writing in the black standard value) process is performed (ST3).

Next, illumination lamp 6 is switched on (ST4), the white shading (writing in the white standard value) process is performed (ST5).

Then, first carriage 7 is moved under the standardising original document on original document table 2 (ST6), the image of the multicolors of the standardising original document is read. At this time, control unit 50 receives each color signal of the standardising original document as standard image signal corrected by shading correction circuit 53 in each of the R, G, B color signals and stores them in memory 55 (ST7).

Next, parameter calculation unit 56, controlled by control unit 50, calculates the average value (namely, Xpr, Xpg, Xpb) of each of the R, G, B color signals of the standard image signal stored in memory 55 (ST8). Based on the calculated average values Xpr, Xpg, Xpb the individual density conversion parameters for each of the R, G, B color signals corresponding to the image of the multicolors of original document D being read are calculated (ST9).

Control unit 50 performs the density conversion process on each color signal read from original document D using the individual R, G, B density conversion parameters calculated by parameter calculation unit 56, fed into density conversion circuit 54 (ST10).

In this case, the density conversion parameters of density conversion circuit 54 impart the density conversion formula D, each R, G, B color signal generally undergoes a linear logarithm conversion.

Now, taking the case of the G signal as an example, Xpg is corrected by dividing into equal values and this density conversion formula D is carried out as following equation (1).

a and b are both constants, the density conversion formula D is written as D= f(X)= -b·log(x+a}, as shown in FIG. 8.

$$
\begin{aligned}
D &= f(x/Xpg) \\
&= -b \cdot \log(x/Xpg + a) \\
&\approx -b \cdot \log((x+a)/Xpg) \\
&= -b \cdot \log(x+a) - b \cdot \log(1/Xpg) \\
&= -b \cdot \log(x+a) + b \cdot \log(Xpg)
\end{aligned}
\quad (1)
$$

Therefore, in order for the process of dividing Xpg to be equalised, the original density conversion parameters constant (b·log(Xpg)) is added into the process.

Similarly, in the case of the R signal it becomes D= −b·log(x+a)+b·log(Xpr), in the case of the B signal it becomes D= −b·log(x+a)+b·log(Xpb).

Now, in main body 1a, the signal value from the reading of each of the R, G, B color signals is Xpr, Xpg, Xpb but Xpr= 0.900, Xpg= 1.200, Xpb= 0.955 is found.

Here, when b= 0.415 and a= 0.00391, the conversion formulae for each of the R, G, B color signals become the following equations (2), (3) and (4).

$$
\begin{aligned}
R\ fr(X) &= -0.415 \times \log(x + 0.00391) + \\
&\quad 0.415 \times \log(0.90) \\
&= f(x) - 0.0189
\end{aligned}
\quad (2)
$$

$$
\begin{aligned}
G\ fg(X) &= -0.415 \times \log(x + 0.00391) + \\
&\quad 0.415 \times \log(1.20) \\
&= f(x) + 0.0328
\end{aligned}
\quad (3)
$$

$$
\begin{aligned}
B\ fb(X) &= -0.415 \times \log(x + 0.00391) + \\
&\quad 0.415 \times \log(0.95) \\
&= f(x) - 0.0092
\end{aligned}
\quad (4)
$$

Namely, in every output the axial shift formed corresponding to the original formula f(x) is only −0.0189, +0.0328, −0.0092.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

For example, the above-mentioned density conversion process, in the case of other than automatic operation, can be performed on the basis of operation of operation panel 60.

In accordance with the above description of the present invention, image forming apparatus is provided which enables, by means of the above-mentioned construction, the density conversion to be performed on each of the color signals using density conversion parameters, with greater accuracy than prior art. In particular an effective correction can be performed of the fluctuation of the ratio of the sensitivity of each of the color signals. Therefore, the image forming process can be performed optimally.

What is claimed is:

1. An image forming apparatus comprising:

a reading means for reading a color image of a first original document and a second original document;

first conversion means for converting a first color image of the first original document and a second color image of the second original document, the first original document being a standard, read by the reading means into a plurality of first separate color signals and a plurality of second separate color signals corresponding to each of the color components of the first and second color images, respectively;

means for calculating density conversion parameters for the plurality of first separate color signals converted by the first conversion means;

second conversion means, operatively coupled to the calculating means, for converting each of the plurality of second separate color signals into optimum color signals using the density conversion parameters of the plurality of first separate color signals; and means for forming a reproduced image of the second original document on an image forming medium based on the optimum color signals converted by the second conversion means with optimum density.

2. The apparatus according to claim 1 further comprising: means for storing the first color signals converted by the first conversion means.

3. The apparatus according to claim 1 wherein the density conversion parameters calculated by the calculating means is given following a density conversion formula D:

$$D = -b \cdot \log(x+a) + b \cdot \log(Xp)$$

wherein a and b represent constants and $Xp$ represents an average value of each of the first separate color signals.

* * * * *